P. J. PICCIRILLI.
BUILDING CONSTRUCTION.
APPLICATION FILED NOV. 5, 1918.

1,365,059.

Patented Jan. 11, 1921.
6 SHEETS—SHEET 1.

Inventor.
P. J. Piccirilli
by Wilkinson & Giusta
Attorneys.

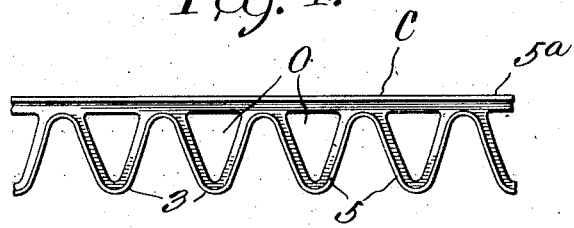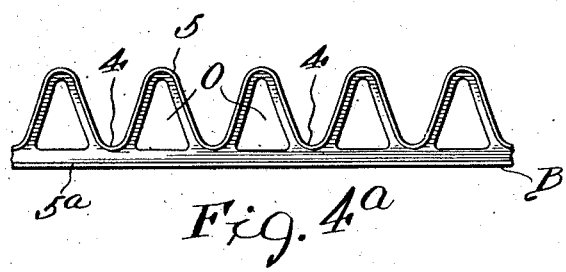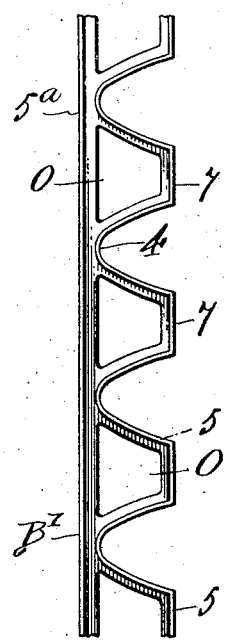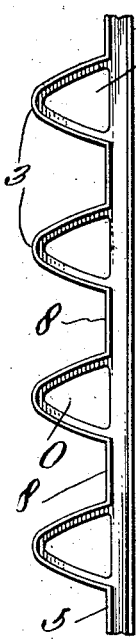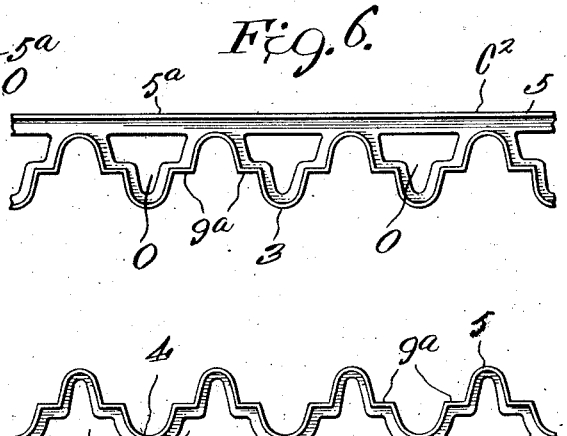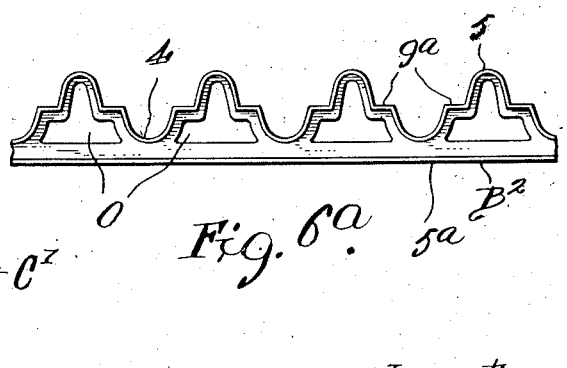

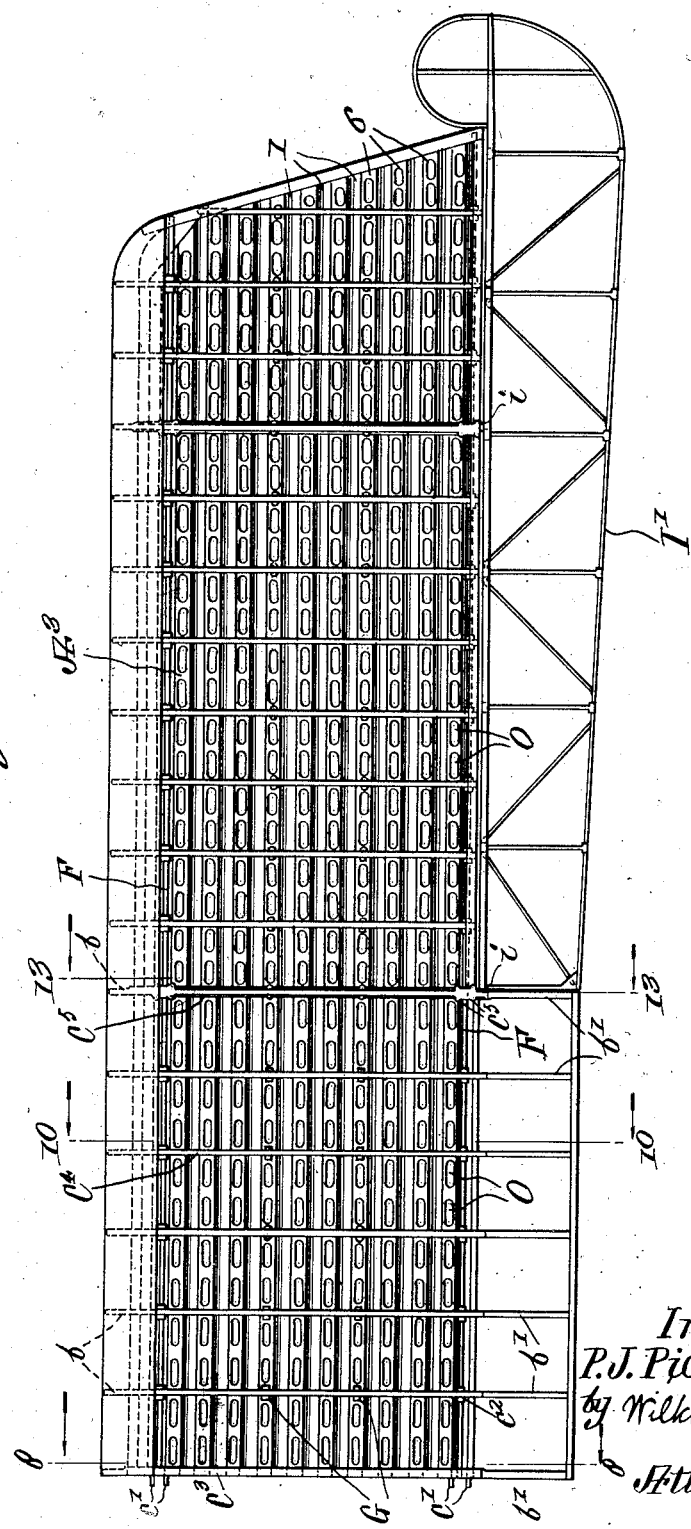

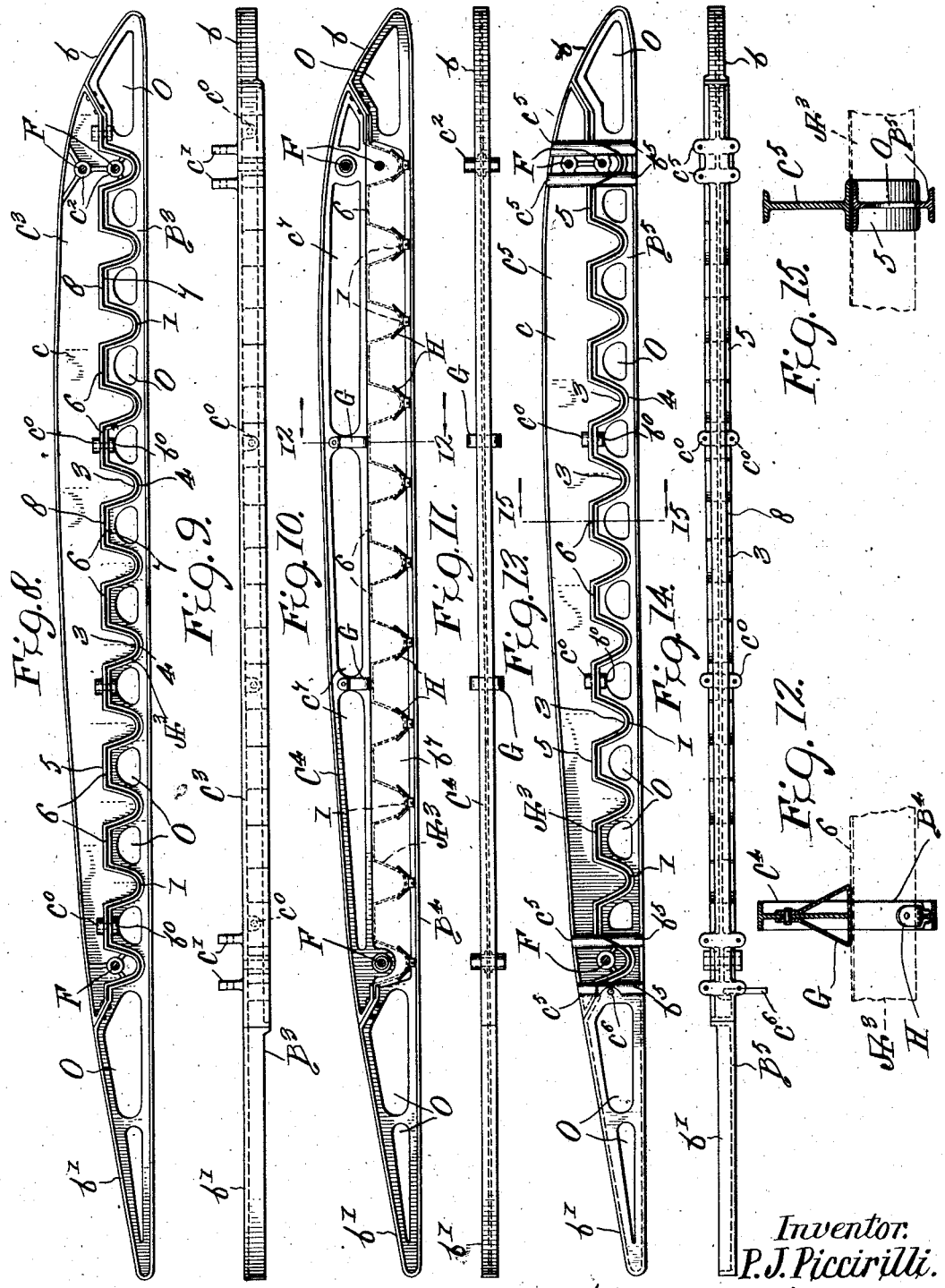

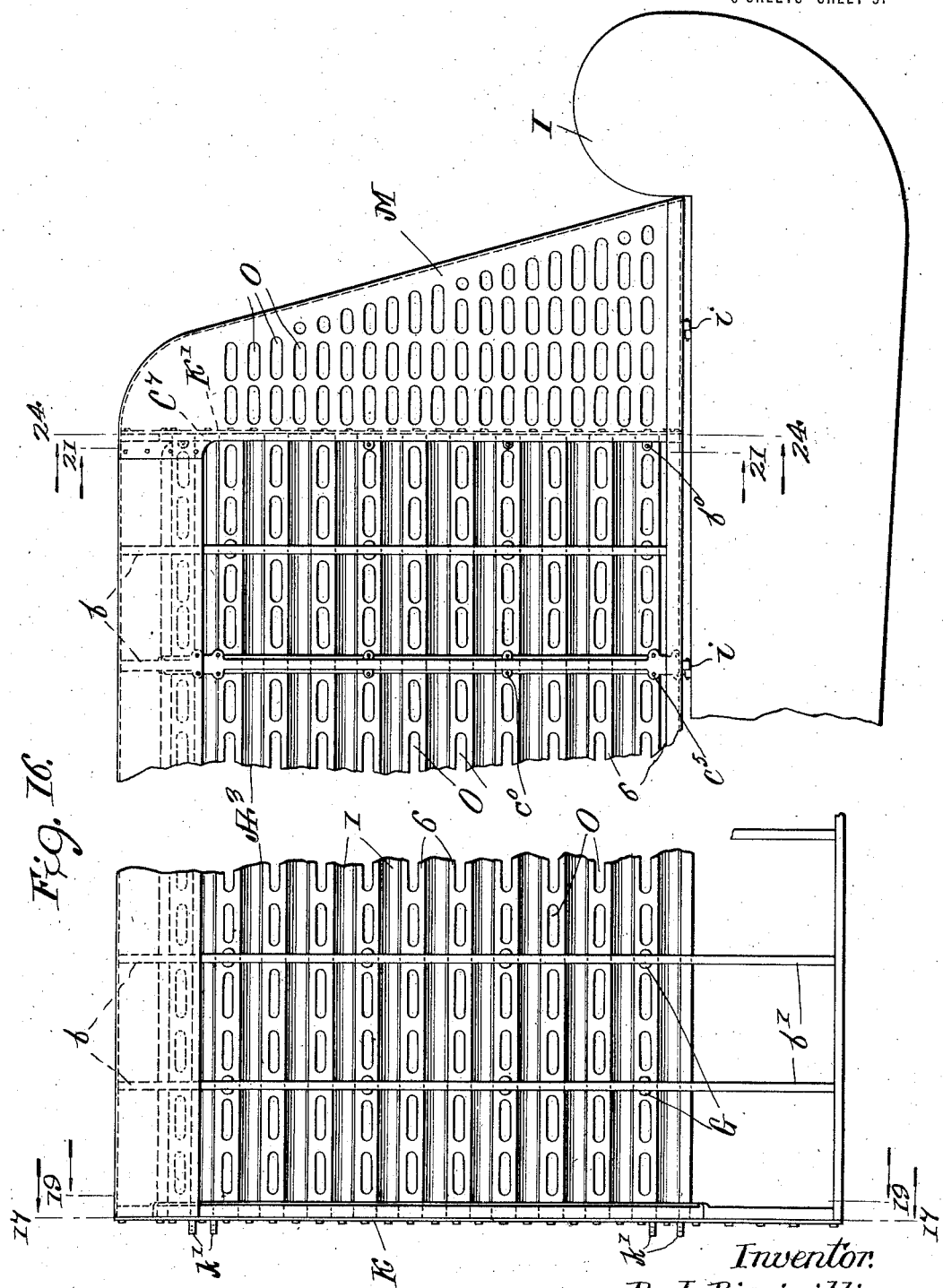

P. J. PICCIRILLI.
BUILDING CONSTRUCTION.
APPLICATION FILED NOV. 5, 1918.
1,365,059.
Patented Jan. 11, 1921.
6 SHEETS—SHEET 6.
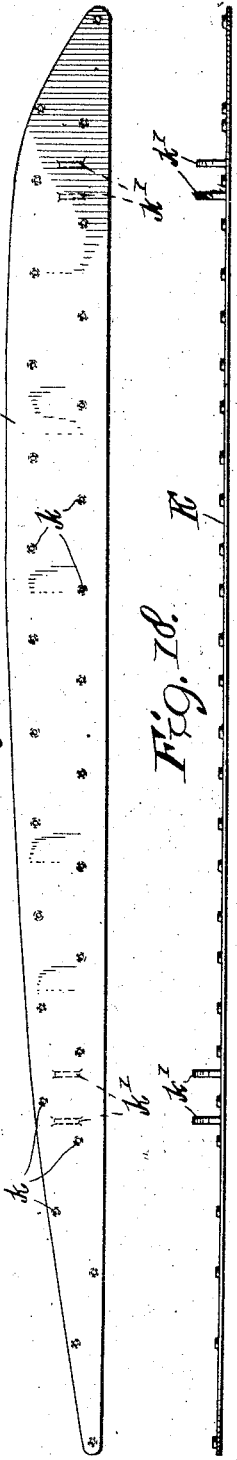
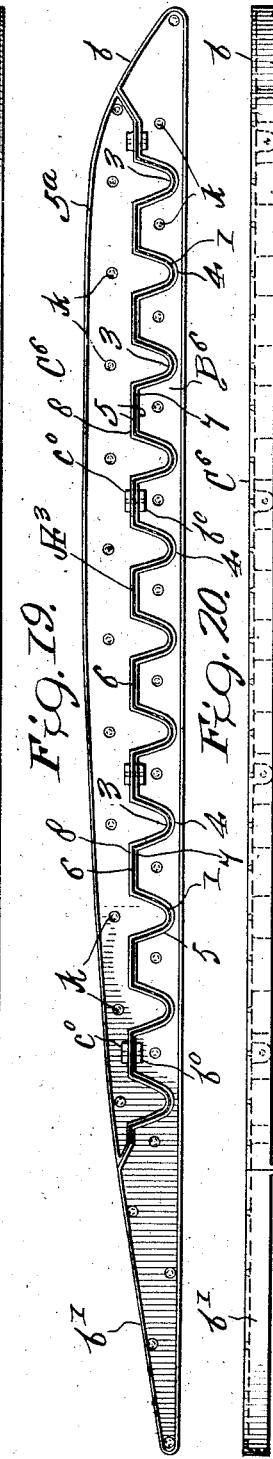
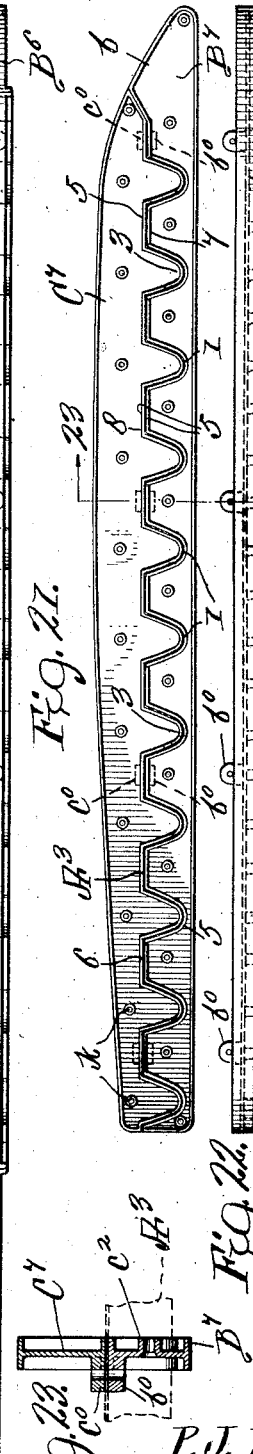
Fig. 14. Fig. 18. Fig. 19. Fig. 20. Fig. 21. Fig. 22. Fig. 23. Fig. 24. Fig. 25.
Inventor
P. J. Piccirilli.
by Wilkinson & Giusta,
Attorneys.

UNITED STATES PATENT OFFICE.

PASQUALE JOSEPH PICCIRILLI, OF THE UNITED STATES NAVY, ASSIGNOR OF ONE-HALF TO HAROLD W. SCOFIELD, OF BUFFALO, NEW YORK.

BUILDING CONSTRUCTION.

1,365,059.  Specification of Letters Patent.  Patented Jan. 11, 1921.

Application filed November 5, 1918. Serial No. 261,243.

*To all whom it may concern:*

Be it known that I, PASQUALE JOSEPH PICCIRILLI, a citizen of the United States, lieutenant (junior grade) United States Navy, stationed at Buffalo, in the county of Erie and State of New York, have invented certain new and useful Improvements in Building Construction; and I do hereby declare the following to be a full, clear, and exact description of the invention, such as will enable others skilled in the art to which it appertains to make and use the same.

My invention relates to a certain new and useful building construction, and it is intended to provide a construction material of such a form as will give the required strength with a minimum weight, and also to provide a construction which may be conveniently and cheaply manufactured, and the parts of which may be readily assembled and disassembled when desired.

The improved building construction is capable of a wide variety of uses, such, for instance, as in floors, ceilings, roofs, walls, garage buildings, ships' decks, ships' bulkheads, aeroplane wings, fuselages, flying boat hulls; and the construction is also adapted for use in automobiles, such as floor boards, running boards, etc., also for use on railway cars, such as box cars and passenger cars, or for use in the construction of bridges, and for a great variety of other purposes.

My invention consists primarily of a construction comprising a corrugated plate or series of plates connected together, which plate or plates are held between beams provided with inter-penetrating projecting arms, between which arms the corrugated metal plate is held firmly and to which it may be secured by additional means, such as bolts, rivets, or the like.

My invention will be more fully understood after reference to the accompanying drawings, in which similar parts are indicated by similar reference symbols throughout the several views, and in which:—

Figure 1:
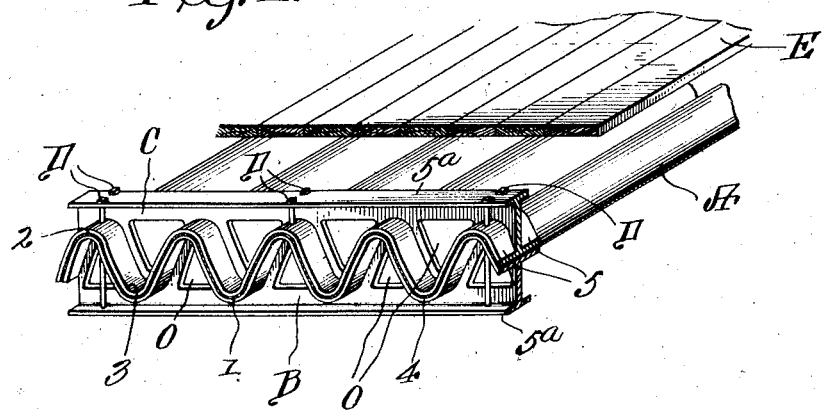
Figure 1 is a perspective view showing the construction supporting a floor or deck.

Figs. 4 and 4ª are side views of the two beams having inter-penetrating arms, as shown in Fig. 1.

Figure 2:
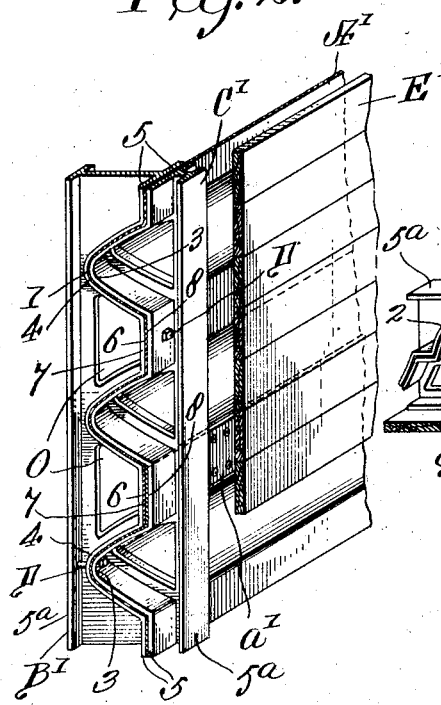
Fig. 2 shows a somewhat similar construction, comprising part of a wall or ship's bulkhead.

Figs. 5 and 5ª are side views of the two beams having inter-penetrating arms, as shown in Fig. 2.

Figure 3:
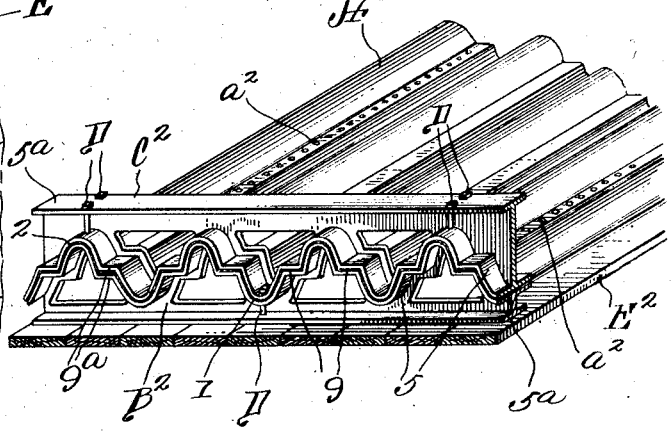
Fig. 3 shows a somewhat modified construction supporting a ceiling.

Figs. 6 and 6ª are side views of the two beams having inter-penetrating arms, as shown in Fig. 3.

Fig. 7 shows a plan view of the framework of an aeroplane wing constructed according to my invention, the fabric covering being omitted.

Fig. 8 shows a section along the line 8—8 of Fig. 7, and looking in the direction of the arrows.

Fig. 9 shows a plan view of the end rib shown in elevation in Fig. 8.

Fig. 10 shows a section along the line 10—10 of Fig. 7, and looking in the direction of the arrows, and illustrates one of the intermediate ribs, the corrugated metal plates being shown in dotted lines for the sake of clearness in the drawings.

Fig. 11 shows a plan view of the intermediate rib shown in Fig. 10.

Fig. 12 shows a section along the line 12—12 of Fig. 10, the corrugated metal plate being shown in dotted lines for the sake of clearness in the drawings.

Fig. 13 shows a section along the line 13—13 of Fig. 11, looking in the direction of the arrows, and shows the rib next the aileron.

Fig. 14 is a plan view of the rib shown in Fig. 13.

Fig. 15 shows a section along the line 15—15 of Fig. 13, and looking in the direction of the arrows, the corrugated plate being shown in dotted lines for the sake of clearness in the drawings.

Fig. 16 shows a modification of an aeroplane wing as constructed in Fig. 7, in which the end ribs are stiffened with end plates, the parts being shown on a larger scale than in said figure, and the fabric covering being omitted to show the parts beneath.

Fig. 17 shows a section along the line 17—17 of Fig. 16, on a still larger scale, and illustrates one of the end plates attached to the inner end rib.

Fig. 18 is a plan view of the plate shown in Fig. 17.

Fig. 19 shows the end rib as taken from a section along the line 19—19 of Fig. 16, and looking in the direction of the arrows.

Fig. 20 is a plan view of the rib shown in Fig. 19, with the reinforcing plate omitted.

Fig. 21 shows the other end rib of the aeroplane wing, the section being along the line 21—21 of Fig. 16, and looking in the direction of the arrows, but the parts being shown on a larger scale than in said figure.

Fig. 22 is a plan view of the end rib shown in Fig. 21, the reinforcing plate being omitted.

Fig. 23 shows a section along the line 23—23 of Figs. 21 and 22, and looking in the direction of the arrows.

Fig. 24 shows a section along the line 24—24 of Fig. 16, and looking in the direction of the arrows; and Fig. 25 is a plan view of the end plates shown in Fig. 24.

Referring first to Figs. 1, 4 and $4^a$, A represents a corrugated sheet of metal which may be in the form of a single continuous sheet, or of a series of corrugated strips secured together in any convenient way. These corrugations are preferably parabolic in shape, with the bends oppositely disposed as at 1 and 2.

B and C are two beams, each substantially eye-shaped in transverse cross section, although any other suitable cross section might be used and each provided with projecting tongues 3 projecting into the corresponding recesses 4 in the opposite beam, and each flanged as at 5 to form a broad holding surface to engage the corrugated plate A; the two beams being secured together by bolts D passing through said flanges 5 and the straight flanges $5^a$ of the beams B and C, and also passing through the plate A and holding the parts securely together.

The beams B and C may be cut away as at O to lighten the parts if desired.

The construction just referred to furnishes a very light but strong structure adapted to resist strains from every conceivable direction, such, for instance, as the heavy weights placed upon the platform E, which may be a floor, deck, roadbed, or the like.

In the arrangement shown in Figs. 2, 5 and $5^a$, the corrugations in the plate A' project only in one direction, as at 1, and these corrugations are connected together by flat portions 6 held between the flat edges of the tongues 7, and the sockets 8 of the beams B' and C', the parts being connected together by bolts D as before described.

E' represents a side wall, bulkhead, or the like, constituting a vertical partition or wall. If desired, the structure shown in Fig. 2 may be turned through 90° so as to have the convolutions 1 vertical, thereby converting the same into hollow pillars.

In the construction shown in Fig. 2, the ends of the plate A' are shown as connected together by the lap joints $a'$.

In the form of construction shown in Figs. 3, 6 and $6^a$, the corrugations are substantially similar to those shown in Fig. 1, except that the plate is flattened, as at 9, to engage the shoulders $9^a$ of the corresponding beams $B^2$ and $C^2$. In this construction, the ends of the plate are shown as connected together by the lap joints $a^2$,-see Fig. 3.

The structure herein described may be used to support either a floor, as shown in Fig. 1, or a ceiling $E^2$ as shown in Fig. 3, but it will be obvious that any one of the structures just described may be used in either the horizontal or the vertical position, or at any angle either with the vertical or the horizontal, since the whole constitutes a rigid, strong and correspondingly light structure.

My invention is more especially adapted for use in the construction of aeroplanes, particularly in the framework for aeroplane wings, and such use of the invention is illustrated in Figs. 7 to 25, which will now be described.

Referring first to Figs. 7 to 15, I have shown in Fig. 7 the framework of one wing of an aeroplane with the fabric covering for same removed.

The general character of the construction as shown in these figures is on the same principle as that already described with reference to Fig. 2, but the forms shown in Figs. 1 and 3 might be substituted for the particular form shown in Fig. 2, if desired.

Referring to Fig. 7, $A^3$ represents a continuous corrugated plate which may be made of a single sheet, or of several sheets of metal secured together in any convenient way, and provided with flat portions 6 between the corrugations as shown in Figs. 8 and 13. These flat portions 6 may be cut away, as at O, if desired, to lighten the sheet, preferably leaving the curved arches 1 continuous lengthwise of the wing, so as to give adequate resiliency thereto. The wing structure is stiffened by transverse ribs, each composed of two beams having interpenetrating arms, such as are shown, for instance, in Figs. 8 to 15.

Certain of these ribs, which I will call "main ribs" are of stronger construction than the others, for instance, shown in Figs. 8 and 13; and the other ribs, which I will call "intermediate ribs," may be of light construction such, for instance, as shown in Fig. 10.

Referring to the construction shown in

Figs. 8 and 9, Fig. 8 shows the end rib which is attached to the fuselage or main body of the flying machine, and it consists of two beams $C^3$ and $B^3$ having interpenetrating arms as shown, and holding between them the plate $A^3$ which is shown flattened as at 6. These beams are shown as provided with lugs $c^0$ and $b^0$ for the fastening bolts, not shown.

The web $c$ of the upper beam $C^3$ is preferably imperforate so as to secure a vertical strength, while the web of the lower beam $B^3$ may be cut away as at O, if desired, to secure lightness.

The lower beam $B^3$ is also provided with projecting ends $b$ and $b'$ of stream-line shape to impart the proper form to the wing when covered with fabric. The upper beam $C^3$ is also preferably provided with sockets $c^2$ to permit the insertion therethrough of the tie rods F, which extend transversely of the wing. The upper beam $C^3$ is also shown as provided with fastening lugs $c'$, by means of which it may be fastened to the main body of the aircraft.

The intermediate ribs shown in Figs. 10, 11 and 12 are preferably of lighter strength than the main ribs, the upper beam $C^4$ preferably being cut away as at $c^7$, and side brackets G being connected thereto to engage on the flat portions 6 of the plate $A^3$.

The lower beam $B^4$ may be cut away also, as at $b^7$, and the curved portions 1 of the plate $A^3$ are shown as projecting into brackets H.

In the construction of the main rib, shown in Figs. 13 and 14, the upper and lower beams $C^5$ and $B^5$ are generally similar to the corresponding beams shown in Fig. 8, but these beams are provided with reinforces $c^5$ and $b^5$ to impart additional vertical strength to the same, and also with hinge attachments $c^6$ for one of the hinges $i$ of the aileron I, the skeleton of which is shown at I' in Fig. 7. The particular details as to the construction of the aileron, and the hinging of the same, not being a part of my present invention will not be further described herein.

The construction shown in Figs. 16 to 25 is generally similar to that already described with reference to Figs. 7 to 15, the corrugated plate $A^3$, with flattened portions 6 and with lightening holes 8 cut out of same, being provided as shown in Figs. 7 to 15; but this currugated plate instead of being continued to the end of the wing may terminate near the end of said wing in an auxiliary frame M, which not being a part of my present invention will not be further described herein.

The difference between this structure and that already described is that I provide vertical stiffening plates for the end ribs, such as shown at K in Figs. 17-18 and K' in Figs. 24-25.

These stiffening plates may be fastened to the upper and lower beams $C^6$ and $B^6$ of Fig. 19, by means of bolts or rivets $k$ to supplement and strengthen the same. The plate K, which is next to the main body of the aeroplane, may be provided with suitable fastening lugs $k'$. These auxiliary plates K and K' tend to materially reinforce and stengthen the ends of the main frame of the wing structure and will also serve to stiffen the entire frame against distortion.

It will be seen that in all of the various forms of construction herein described, I provide a corrugated metal plate composed of a single sheet, or a series of sheets of metal, to which are secured firmly a series of pairs of interpentrating beams, the arms on said beams being provided to register with the corrugations in the plate to form with said corrugations a firm joint.

This structure affords an especially strong, light and durable construction which is not readily distorted by strains from any direction, and the various parts may be rolled or stamped out of metal in standard sizes and shaped so as to be very readily assembled and disassembled when desired.

The strength of the structure may be varied by varying the transverse curve of the convolutions and the general shape of the same; but the effects of such variations are well known in the art and need not be further discussed herein.

While I have shown the corrugated plates of a single thickness, except where lap joints are shown, it will be obvious that laminated plates may be used if desired.

While I have shown the invention as adapted for a variety of uses, it will be obvious that it may be used in a great many other relations than those stated herein, and I do not mean that the invention should be limited to the details of construction herein described and shown except as particularly pointed out in the claims; as it will be obvious that various changes might be made in the construction, combination and arrangement of parts which could be used without departing from the spirit of my invention.

Having thus described my invention, what I claim and desire to secure by Letters Patent of the United States is:—

1. In a building construction the combination with a corrugated plate, of a series of oppositely disposed pairs of transverse beams each I-shaped in cross-section and provided with interpenetrating arms, the inner flanges on said arms being adapted to register with and grip said corrugated plate, and means for securing said beams and said plate together, substantially as described.

2. In a building construction the combination with a corrugated plate, of a series of oppositely disposed pairs of transverse beams each I-shaped in cross-section and provided with interpenetrating arms, the inner flanges on said arms being adapted to register with and grip said corrugated plate, and bolts passing through the flanges in oppositely disposed arms and through the plate secured therebetween, substantially as described.

3. A building construction including a frame and a sheathing therefor, said frame comprising a corrugated plate, a series of oppositely disposed pairs of transverse beams each I-shaped in cross section and provided with interpenetrating arms, the inner flanges on said arms being adapted to register with and grip said corrugated plate, and means for securing said beams and said plate together, substantially as described.

PASQUALE JOSEPH PICCIRILLI.